(12) United States Patent
Jung (10) Patent No.: US 11,718,310 B2
(45) Date of Patent: Aug. 8, 2023

(54) DEVICE AND METHOD FOR CONTROLLING UPDATES OF ECUS OF VEHICLE

(71) Applicants: Hyundai Motor Company, Seoul (KR); Kia Motors Corporation, Seoul (KR)

(72) Inventor: Jae Won Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 74 days.

(21) Appl. No.: 16/950,277

(22) Filed: Nov. 17, 2020

(65) Prior Publication Data

US 2021/0403016 A1 Dec. 30, 2021

(30) Foreign Application Priority Data

Jun. 30, 2020 (KR) .................. 10-2020-0080432

(51) Int. Cl.
| | |
|---|---|
| *G06F 8/65* | (2018.01) |
| *H04L 67/12* | (2022.01) |
| *G06F 9/445* | (2018.01) |
| *G06F 9/455* | (2018.01) |
| *G06F 8/71* | (2018.01) |
| *B60W 50/06* | (2006.01) |
| *B60W 50/02* | (2012.01) |
| *G06F 11/14* | (2006.01) |

(52) U.S. Cl.
CPC ........ *B60W 50/06* (2013.01); *B60W 50/0205* (2013.01); *G06F 8/65* (2013.01); *G06F 11/1433* (2013.01); *B60W 2510/244* (2013.01)

(58) Field of Classification Search
CPC ......... H04L 67/12; H04L 67/34; Y02T 10/70; Y02T 10/7072; Y02T 10/62; Y02T 10/72; G06F 8/65; G06F 8/71; G06F 11/1433; G07C 5/008; G07C 5/0808; G07C 5/0816; B60W 50/06; B60W 50/0205; B60W 2510/244
See application file for complete search history.

(56) References Cited

U.S. PATENT DOCUMENTS

| | | | | |
|---|---|---|---|---|
| 11,144,300 | B2 * | 10/2021 | Jeong | G07C 5/008 |
| 2017/0060559 | A1 * | 3/2017 | Ye | G06F 8/65 |
| 2019/0057214 | A1 * | 2/2019 | Xia | H04W 12/06 |
| 2019/0250903 | A1 * | 8/2019 | Seki | B60R 16/033 |
| 2019/0354363 | A1 * | 11/2019 | Nakaguma | G06F 8/65 |
| 2020/0050442 | A1 * | 2/2020 | Sakurai | H04L 67/12 |
| 2020/0215930 | A1 * | 7/2020 | Izumi | B60R 16/02 |

* cited by examiner

*Primary Examiner* — Thuy Dao
(74) *Attorney, Agent, or Firm* — Fox Rothschild LLP (57) ABSTRACT

A device and a method for controlling updates of ECUs of a vehicle are provided. A communication device receives a request for associated software updates of electronic control units (ECUs) arranged within a vehicle, and a controller determines whether to start the vehicle based on a state of charge (SOC) of a battery. The controller performs updates of ECUs in a first group in a start on state of the vehicle, and performs updates of ECUs in a second group in a start off state of the vehicle to complete a software update for a function involving the plurality of ECUs.

19 Claims, 4 Drawing Sheets

DEVICE AND METHOD FOR CONTROLLING UPDATES OF ECUS OF VEHICLE

CROSS-REFERENCE TO RELATED APPLICATION

This application claims the benefit of priority to Korean Patent Application No. 10-2020-0080432, filed on Jun. 30, 2020, the entire contents of which are incorporated herein by reference.

TECHNICAL FIELD

The present disclosure relates to a technology of controlling updates (e.g., firmware updates) of electronic control units (ECUs) disposed within a vehicle.

BACKGROUND

As digitization of parts for a vehicle is rapidly progressing, types and number of electronic devices mounted on the vehicle are greatly increased. The electronic device may be used in a power train control system, a body control system, a chassis control system, a vehicle network, a multimedia system, and the like. The powertrain control system may include an engine control system, an automatic transmission control system, and the like. The body control system may include a body electronics control system, a device for convenience control system, a lamp control system, and the like. The chassis control system may include a steering device control system, a brake control system, a suspension control system, and the like. The vehicle network may include a controller area network (CAN), a FlexRay-based network, a media oriented system transport (MOST)-based network, and the like. The multimedia system may include a navigation device system, a telematics system, an infotainment system, and the like.

Such systems and electronic devices forming each of the systems are connected to each other via the vehicle network, and a vehicle network for supporting a function of each of the electronic devices is required. The CAN may support a transmission speed of up to 1 Mbps, and may support automatic retransmission of a collided frame, a cycle redundancy check (CRC)-based error detection, and the like. The FlexRay-based network may support the transmission speed of up to 10 Mbps, and may support simultaneous transmission of data through two channels, data transmission in a synchronous manner, and the like. The MOST-based network is a communication network for high-quality multimedia, which may support the transmission speed of up to 150 Mbps.

In one example, the telematics system, the infotainment system, an improved safety system, and the like of the vehicle require a high transmission speed, a system scalability, and the like, and the CAN, the FlexRay-based network, and the like do not support the same sufficiently. The MOST-based network may support a higher transmission speed compared to the CAN and the FlexRay-based network, but a lot of cost is consumed to apply the MOST-based network to all networks of the vehicle. Accordingly, an Ethernet-based network may be considered as the vehicle network. The Ethernet-based network may support bidirectional communication through a pair of windings, and may support the transmission speed of up to 10 Gbps.

Recently, there is an increasing demand for an update (a software update) of an ECU disposed within the vehicle, and accordingly, various schemes for updating each ECU connected to the vehicle network have been proposed. In a process of updating a plurality of ECUs, a conventional technology of updating each ECU disposed in the vehicle performs the update up to an ECU that is currently being updated when a state of charge (SOC) of a battery disposed in the vehicle is equal to or less than a reference value (e.g., 75%), and performs the updates of remaining ECUs (e.g., ECUs waiting for the updates) when the SOC of the battery exceeds the reference value in the future.

The conventional technology does not affect travel of the vehicle in a case of updates (individual software updates) of ECUs for functions that operate independently of each other. However, in a case of performing associated software updates (e.g., updates of ECUs associated with an autonomous driving function), such a conventional technology has to but is not able to update all ECUs associated with the autonomous driving function, thereby making it impossible for the vehicle to travel normally. In other words, the conventional technology has a problem in that normal autonomous driving is impossible since the associated software updates of the ECUs are not able to be completed within one driving cycle.

The matters described in this background art part are written to improve the understanding of the background of the invention, and may include matters other than the prior art already known to those skilled in the art to which this technology belongs.

SUMMARY

The present disclosure provides a device and a method for controlling updates of ECUs of a vehicle capable of, when performing associated software updates of ECUs arranged in the vehicle, determining whether to start the vehicle based on a SOC of a battery, dividing ECUs to be updated in a start on state of the vehicle and ECUs to be updated in a start off state of the vehicle, and collectively performing the associated software updates of the ECUs, thereby normally completing a software update for a function involving a plurality of ECUs.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling updates of ECUs of a vehicle may include a communication device configured to receive a request for associated software updates of the electronic control units (ECUs) arranged in the vehicle, and a controller configured to determine whether to start the vehicle based on a state of charge (SOC) of a battery, perform updates of ECUs in a first group in a start on state of the vehicle, and perform updates of ECUs in a second group in a start off state of the vehicle.

In one implementation, the controller may be configured to start the vehicle when the SOC of the battery is equal to or less than a reference SOC when the battery outputs a total amount of power required for the updates of the ECUs. In one implementation, the controller may be configured to perform a rollback on an update-completed ECU when there is an update-failed ECU when performing the updates of the ECUs in the first group. In addition, the controller may be configured to turn off the vehicle and then perform the updates of the ECUs in the second group when the updates of the ECUs in the first group are completed.

The controller may be configured to turn off the vehicle when the SOC of the battery exceeds a reference SOC even when the battery outputs a total amount of power required for the updates of the ECUs in the second group. The controller may be configured to perform a rollback on an update-completed ECU when there is an update-failed ECU when performing the updates of the ECUs in the second group. The communication device may be configured to receive, from an update server, information on the plurality of ECUs to be updated, update data applied to each of the plurality of ECUs, information on the ECUs contained in the first group, and information on the ECUs contained in the second group. The device may further include an output device configured to display a window inquiring a user whether to approve the associated software updates, and an input device configured to receive approval or rejection for the associated software updates from the user.

According to another aspect of the present disclosure, a method for controlling updates of ECUs of a vehicle may include receiving a request for associated software updates of the electronic control units (ECUs) arranged in the vehicle, determining whether to start the vehicle based on a state of charge (SOC) of a battery, performing updates of ECUs in a first group in a start on state of the vehicle, and performing updates of ECUs in a second group in a start off state of the vehicle.

In one implementation, the determining of whether to start the vehicle may include starting the vehicle when the SOC of the battery is equal to or less than a reference SOC when the battery outputs a total amount of power required for the updates of the ECUs. In addition, the performing of the updates of the ECUs in the first group may include performing a rollback on an update-completed ECU when there is an update-failed ECU. The performing of the updates of the ECUs in the second group may include timing off the vehicle when the updates of the ECUs in the first group are completed.

Further, the performing of the updates of the ECUs in the second group may include turning off the vehicle at a time point the updates of the ECUs in the first group are completed when the SOC of the battery exceeds a reference SOC even when the battery outputs a total amount of power required for the updates of the ECUs in the second group. In one implementation, the performing of the updates of the ECUs in the second group may include performing a rollback on an update-completed ECU when there is an update-failed ECU.

In addition, the receiving of the request for the associated software updates of the ECUs arranged in the vehicle may include receiving, from an update server, information on the plurality of ECUs to be updated, update data applied to each of the plurality of ECUs, information on the ECUs contained in the first group, and information on the ECUs contained in the second group. The method may further include displaying a window prompting the a user to approve the associated software updates, and receiving approval or rejection for the associated software updates from the user.

According to another aspect of the present disclosure, a method for controlling updates of ECUs of a vehicle may include receiving a request for associated software updates of the electronic control units (ECUs) arranged within the vehicle, displaying a window prompting a user to approve the updates, receiving approval from the user, starting the vehicle when a state of charge (SOC) of a battery is equal to or less than a reference SOC when the battery outputs a total amount of power required for the updates of the ECUs, performing updates of ECUs in a first group in a start on state of the vehicle, turning off the vehicle at a time point the updates of the ECUs in the first group are completed when the SOC of the battery exceeds the reference SOC even when the battery outputs a total amount of power required for updates of ECUs in a second group, and performing the updates of the ECUs in the second group in a start off state of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of the related known configuration or function will be omitted when it is determined that it interferes with the understanding of the embodiment of the present disclosure.

In describing the components of the exemplary embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In an exemplary embodiment of the present disclosure, a start on state of a vehicle refers to a state in which a battery 810 that supplies power to an electric load is being charged, which may refer to a state in which an engine is running in an internal combustion engine vehicle, refer to a state in which travel is possible in an electric vehicle, and refer to a state in which a fuel cell is operating in a fuel cell vehicle.

Figure 1:
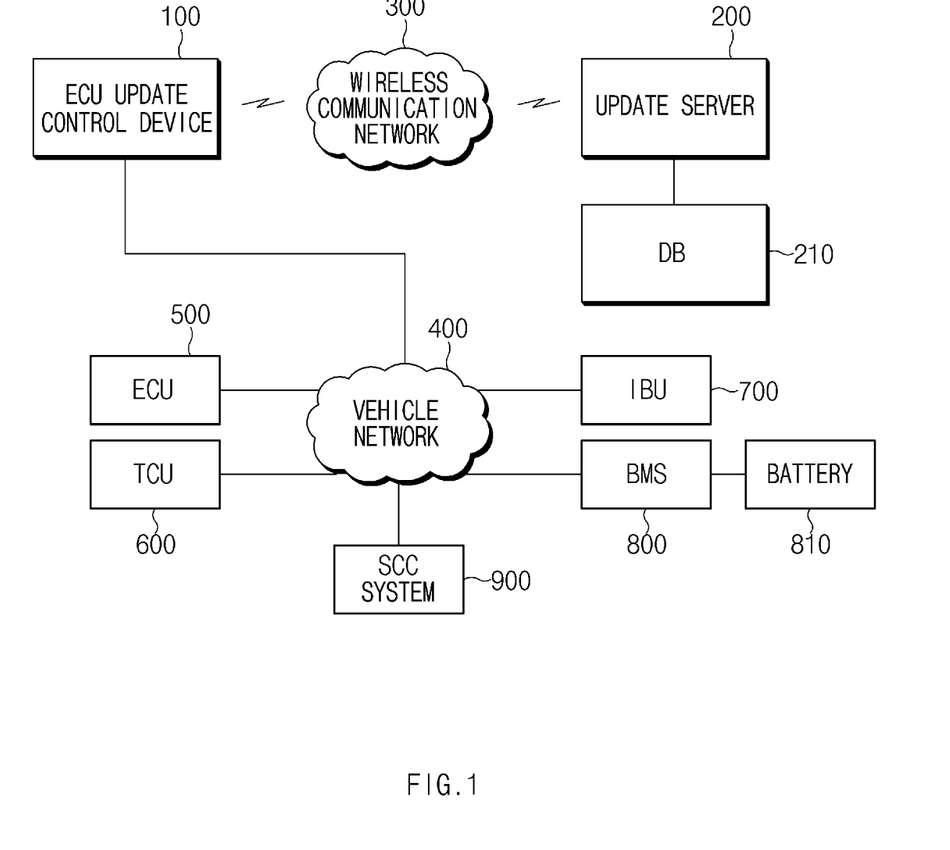
FIG. 1 is an exemplary diagram of a network environment to which an exemplary embodiment of the present disclosure is applied.

FIG. 1 is an exemplary diagram of a network environment to which an exemplary embodiment of the present disclosure is applied. As shown in FIG. 1, a network environment to which an exemplary embodiment of the present disclosure is applied may include an ECU update control device 100, an update server 200, a wireless communication network 300, a vehicle network 400, an engine control unit (ECU) 500, a transmission control unit (TCU) 600, an integrated body control unit (IBU) 700, a battery management system (BMS) 800, a smart cruise control (SCC) system 900, and the like of the vehicle.

When performing associated software updates of electronic control units (ECUs) arranged in the vehicle, the electronic control unit (ECU) update control device 100 of the vehicle may be configured to determine whether to start the vehicle based on a SOC of the battery 810, divide electronic control units (ECUs) to be updated in the start on state of the vehicle and electronic control units (ECUs) to be updated in a start off state of the vehicle, and collectively perform the associated software updates of the electronic control units (ECUs), thereby normally completing a software update for a function involving a plurality of electronic control units (ECUs). In this connection, the collective performance refers to an active update with no temporal gap.

For reference, a passive update refers to an update in which, in a process of updating the plurality of electronic control units (ECUs), the update may be performed up to an electronic control unit (ECU) that is currently being updated when the SOC of the battery 810 disposed in the vehicle is equal to or less than a reference value, and updates of remaining ECUs (ECUs waiting for the updates) may be performed when the vehicle is in the start on state by a driver in the future and the battery 810 is charged.

On the other hand, the active update refers to completing the associated software updates for the electronic control units (ECUs) without the temporal gap (within one driving cycle) by starting the vehicle as needed rather than waiting for an unknown time at which the vehicle becomes in the start on state by the driver and the battery 810 is charged (which generates the time gap). In other words, the active update refers to performing by the ECU update control device 100, updates of electronic control units (ECUs) in a first group in the start on state of the vehicle by starting the vehicle, and performing updates of electronic control units (ECUs) in a second group in the start off state of the vehicle by turning off the vehicle when the battery 810 is charged to a certain extent.

The ECU update control device 100 of the vehicle may be configured to execute the update of each electronic control unit (ECU), and a subject of the actual update is each electronic control unit (ECU). The ECU update control device 100 of the vehicle may be configured to perform an over the air (OTA) update process in association with the update server 200. The update server 200 may be implemented as an over the air (OTA) server as an example, and may be configured to manage information on each ECU associated with each function and update data corresponding to the associated ECU. In other words, the update server 200 may be configured to store information on a plurality of ECUs to be updated in association with a specific function (e.g., an autonomous driving function) and update data applied to each of the plurality of ECUs in a database (DB) 210. In this connection, the information on the plurality of ECUs may include identification information on the ECUs to be updated in the start on state of the vehicle, and identification information on the ECUs to be updated in the start off state of the vehicle. In this connection, the ECU that should be updated in the vehicle start off state refers to an ECU involved in the start of the vehicle.

The update server 200 may be configured to communicate with the ECU update control device 100 of the via through the wireless communication network 300. The update server 200 may be configured to transmit information on the ECUs associated with the associated software update and update data applied to each ECU to the ECU update control device 100 of the vehicle. The wireless communication network 300 may include a mobile communication network, a wireless Internet, a short-range communication network, and the like. The vehicle network 400 may include a controller area network (CAN), a controller area network with flexible data-rate (CAN FD), a local interconnect network (LIN), a FlexRay, a media oriented system transport (MOST), an Ethernet, and the like.

The ECU 500 may be connected to the vehicle network 400 and may be configured to perform overall control of the engine disposed in the vehicle. The ECU 500 may be replaced with a vehicle control unit (VCU) in the electric vehicle, and may be replaced with a fuel cell control unit (FCU) in the fuel cell vehicle. The TCU 600 may be connected to the vehicle network 400, and may be configured to perform overall control of a transmission disposed in the vehicle.

The IBU 700 is an ECU incorporating a body control unit (BCM), a smart key system (SKS), and a tire pressure monitoring system (TPMS), which may communicate with individual ECUs that respectively control a wiper, a headlamp, a power seat, and the like to operate electrical devices of the vehicle in an integrated manner. In particular, the IBU 700 may be configured to start or turn off the vehicle. In this connection, the BCM may have functions of rear curtain control, vehicle lock control, exterior lamp control, wiper/washer control as convenience functions, and may have functions of vehicle alert condition control, mobile telematics system (MTS) related alarm control, front and rear parking assist control, and warning control based on a seat belt or door opening as safety functions. The SKS may be configured to recognize a smart key to lock/unlock the vehicle with a push button of a door handle, pop a trunk, generate a warning based on a location of the smart key, and allow the vehicle start with a start button located next to a steering wheel when the smart key is inside the vehicle. The TPMS may be configured to monitor an air pressure of each tire based on each tire pressure sensor (TPS) mounted on each wheel of the vehicle.

The BMS 800 may be configured to perform overall control of the battery 810 that supplies the power to the electric load of the vehicle. In particular, the BMS 800 may be configured to manage the SOC of the battery 810, and provide SOC information of the battery 810 to the ECU update control device 100 of the vehicle via the vehicle network 400. In addition, the BMS 800 may be configured to adjust the charging of the battery 810 in the start on state of the vehicle. The SCC system 900 may provide speed information of the vehicle to the ECU update control device 100 of the vehicle via the vehicle network 400.

Figure 2:
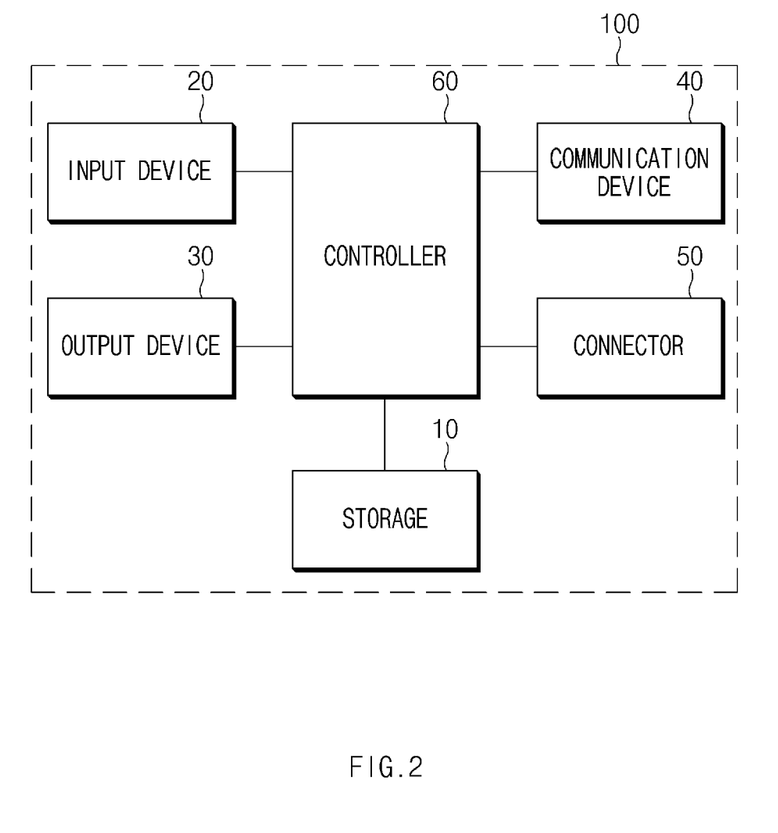
FIG. 2 is a configuration diagram of a device for controlling updates of ECUs of a vehicle according to an exemplary embodiment of the present disclosure.

FIG. 2 is a configuration diagram of a device for executing updates of ECUs of a vehicle according to an exemplary embodiment of the present disclosure. As shown in FIG. 2, the ECU update control device 100 of the vehicle according to an exemplary embodiment of the present disclosure may include a storage 10, an input device 20, an output device 30, a communication device 40, a connector 50, and a controller 60. In this connection, components may be coupled with each other to be implemented as a single component or some components may be omitted based on a scheme of implementing the ECU update control device 100 of the vehicle according to an exemplary embodiment of the present disclosure.

In a description of each of the components, first, the storage 10 may be configured to store various logics, algorithms, and programs required in the process of determining whether to start the vehicle based on the SOC of the battery 810, dividing the ECUs to be updated in the start on state of the vehicle and the ECUs to be updated in the start off state of the vehicle, and collectively performing the associated software updates of the ECUs (e.g., completing the updates of ECUs within one driving cycle), when performing the associated software updates of the ECUs arranged within the vehicle.

The storage 10 may be configured to store the information on the plurality of ECUs to be updated in association with the specific function (e.g., the autonomous driving function) and the update data applied to each of the plurality of ECUs. In this connection, the information on the plurality of ECUs may include the identification information on the ECUs to be updated in the start on state of the vehicle, and the identification information on the ECUs to be updated in the start off state of the vehicle. The information may be received from the update server 200.

The storage 10 may be configured to store a reference SOC value (e.g., about 75%) used to determine the charging of the battery 810. The storage 10 may be configured to store an operating current of each ECU disposed in the vehicle, a communication speed in the vehicle, and the like. The storage 10 may include a storage medium of at least one type of memory such as a flash memory type, a hard disk type, a micro type, and a card type (for example, a secure digital card (SD card) or an extream digital card (XD card)), and the like, and a memory such as a random access memory (RAM), a static RAM (SRAM), a read only memory (ROM), a programmable ROM (PROM), an electrically erasable PROM (EEPROM), a magnetic RAM (MRAM), a magnetic disk, and an optical disk.

The input device 20 may include a touch key and a push key (a mechanical key), and may be configured to receive information from a user. As an example, the input device 20 may be configured to receive an approval for the associated software update from the user. The output device 30 may include a video output device and an audio output device, and may be configured to display a window inquiring the user whether to approve the associated software update. The communication device 40, which is a module that provides an interface of communication with the update server 200, may be configured to receive the information on the plurality of ECUs to be updated in association with the specific function of the vehicle and the update data applied to each of the plurality of ECUs.

In particular, the communication device 40 may include at least one of a mobile communication module, a wireless Internet module, and a short-range communication module. The mobile communication module may be configured to receive the update data via a mobile communication network established based on technical standards or communication schemes for mobile communication (e.g., a global system for mobile communication (GSM), a code division multi access (CDMA), a code division multi access 2000 (CDMA2000), an enhanced voice-data optimized or enhanced voice-data only (EV-DO), a wideband CDMA (WCDMA), a high speed downlink packet access (HSDPA), a high speed uplink packet access (HSUPA), a long term evolution (LTE), a long term evolution-advanced (LTEA), and the like).

The wireless Internet module, which is a module for wireless Internet access, be configured to receive the update data through a wireless LAN (WLAN), a wireless-fidelity (Wi-Fi), a wireless fidelity (Wi-Fi) Direct, a digital living network alliance (DLNA), a wireless broadband (WiBro), a world interoperability for microwave access (WiMAX), a high speed downlink packet access (HSDPA), a high speed uplink packet access (HSUPA), a long term evolution (LTE), a long term evolution-advanced (LTE-A), and the like.

The short-range communication module may support short-range communication using at least one of Bluetooth™, radio frequency identification (RFID), infrared data association (IrDA), ultra wideband (UWB), ZigBee, near field communication (NFC), and wireless universal serial bus (USB) technologies. The connector 50 may provide an interface of connection with the vehicle network.

The controller 60 may be configured to execute overall control such that each of the components perform a function thereof. The controller 60 may be implemented in a form of hardware, may be implemented in a form of software, or may be implemented in a form in which the hardware and the software are coupled to each other. The controller 60 may be implemented as a microprocessor, but may not be limited thereto.

In particular, the controller 60 may be configured to perform various controls in the process of, when performing the associated software updates of the ECUs arranged within the vehicle, determining whether to start the vehicle based on the SOC of the battery 810, dividing the ECUs (hereinafter, the ECUs in the first group) to be updated in the start on state of the vehicle and the ECUs (hereinafter, the ECUs in the second group) to be updated in the start off state of the vehicle, and collectively performing the associated software updates of the ECUs (completing the updates of ECUs within one driving cycle).

Figure 3:
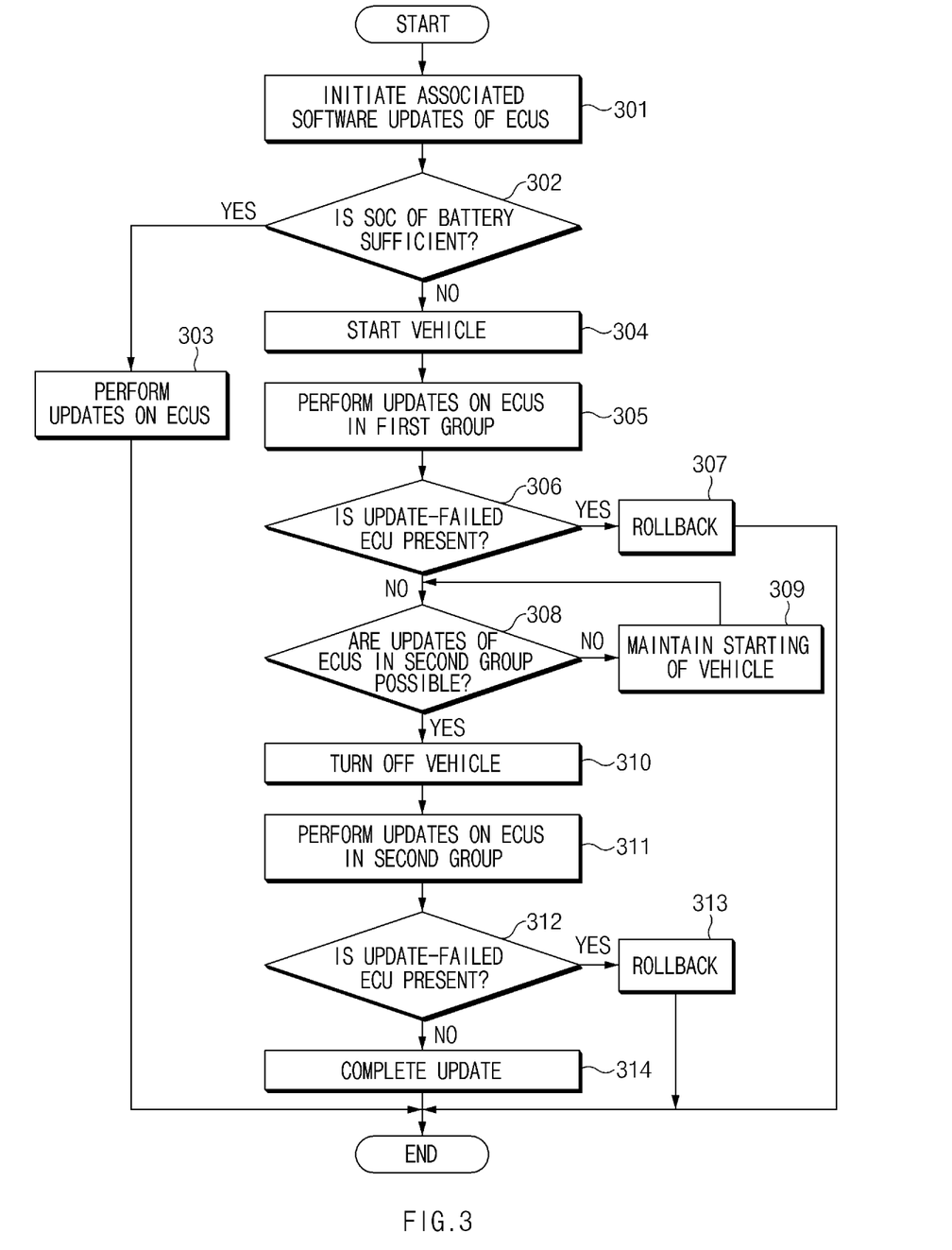
FIG. 3 is a flowchart of a method for controlling updates of ECUs of a vehicle according to an exemplary embodiment of the present disclosure.

Hereinafter, an operation of the controller 60 will be described in detail with reference to FIG. 3. FIG. 3 is a flowchart of a method for controlling updates of ECUs of a vehicle according to an exemplary embodiment of the present disclosure. First, the update server 200 may be configured to request the update to the ECU update control device 100 of the vehicle. In this connection, the update server 200 may be configured to transmit the information on the plurality of ECUs to be updated and the update data applied to each of the plurality of ECUs.

Thereafter, when the vehicle is turned off, the transmission of the vehicle is located in a park (P) stage, the vehicle is in a stop state, and the SOC of the battery 810 exceeds the reference SOC, the controller 60 in the ECU update control device 100 of the vehicle may be configured to display the update approval window through the output device 30 and may be configured to receive approval or rejection of the user through the input device 20. In this connection, in the case of the associated software updates of the ECUs arranged in the vehicle, the controller 60 may be configured to output a notification to user driver through the output device 30 indicating that the update is in progress while the driver is on board.

Thereafter, when performing the associated software updates of the ECUs arranged in the vehicle (301), the controller 60 may be configured to determine whether the SOC of the battery 810 is sufficient for the ECUs to perform the updates (302). In other words, the controller 60 may be configured to calculate a total amount of power A required for the ECUs to perform the updates, and identify whether the SOC of the battery 810 exceeds the reference SOC even when the battery 810 outputs the total amount of power A In this connection, the controller 60 may be configured to calculate a total amount of power $P_{total}$ based on a following Equation 1.

$$P_{total}=I_{total}\times(C_{total}/S)$$  Equation 1 wherein, total is a sum of the operating currents of the ECUs, $C_{total}$ is a sum of update data capacities of the ECUs, and S is the communication speed in the vehicle.

As the identification result (302), when the SOC of the battery 810 is sufficient for the ECUs to perform the updates, the controller 60 may be configured to collectively perform the associated software updates of the ECUs without starting the vehicle (303). As the identification result (302), when the SOC of the battery 810 is insufficient for the ECUs to perform the updates, that is, when the SOC of the battery 810 is equal to or less than the reference SOC when the battery 810 outputs the total amount of power A, the controller 60 may be configured to start the vehicle in association with the IBU 700 (304), and perform the associated software updates for the ECUs in the first group (305). In this connection, when the vehicle is started, the charging of the battery 810 may begin.

Thereafter, the controller 60 may be configured to determine whether there is an update-failed ECU in the process of performing the associated software updates targeting the ECUs in the first group (306). In this connection, the controller 60 only executes the associated software updates of the ECUs, and the actual updates may be directly performed by the ECUs. As the identification result (306), in response to determining that there is the update-failed ECU, the controller 60 may be configured to perform a rollback on an update-completed ECU (307). For reference, the rollback refers to a function to return to a state before the update.

As the identification result (306), when there is no update-failed ECU, the controller 60 may be configured to calculate a total amount of power B required to update the ECUs in the second group, and determine whether the SOC of the battery 810 exceeds the reference SOC even when the battery 810 outputs the total amount of power B (308). As the identification result (308), when the updates of the ECUs in the second group are not available, that is, when the SOC of the battery 810 is less than the reference SOC when the battery 810 outputs the total amount of power B, the controller 60 may be configured to maintain the starting of the vehicle (309).

As the identification result (308), when the updates of the ECUs in the second group are available, the controller 60 may be configured to turn off the vehicle in association with the IBU 700 (310). Thereafter, the controller 60 may be configured to perform the associated software updates targeting the ECUs in the second group (311). Then controller 60 then be configured to determine whether there is the update-failed ECU in the process of performing the associated software updates targeting the ECUs in the second group (312).

As the identification result (312), the controller 60 may be configured to perform the rollback on the update-completed ECU (including the ECU in the first group) when there is the update-failed ECU (313). As a result, when even one of the ECUs subject to update fails to update, the controller 60 may be configured to perform the rollback on all update-completed ECUs. As the identification result (312), the controller 60 may be configured to terminate the updates when the updates of all ECUs in the second group are normally completed (314).

Figure 4:
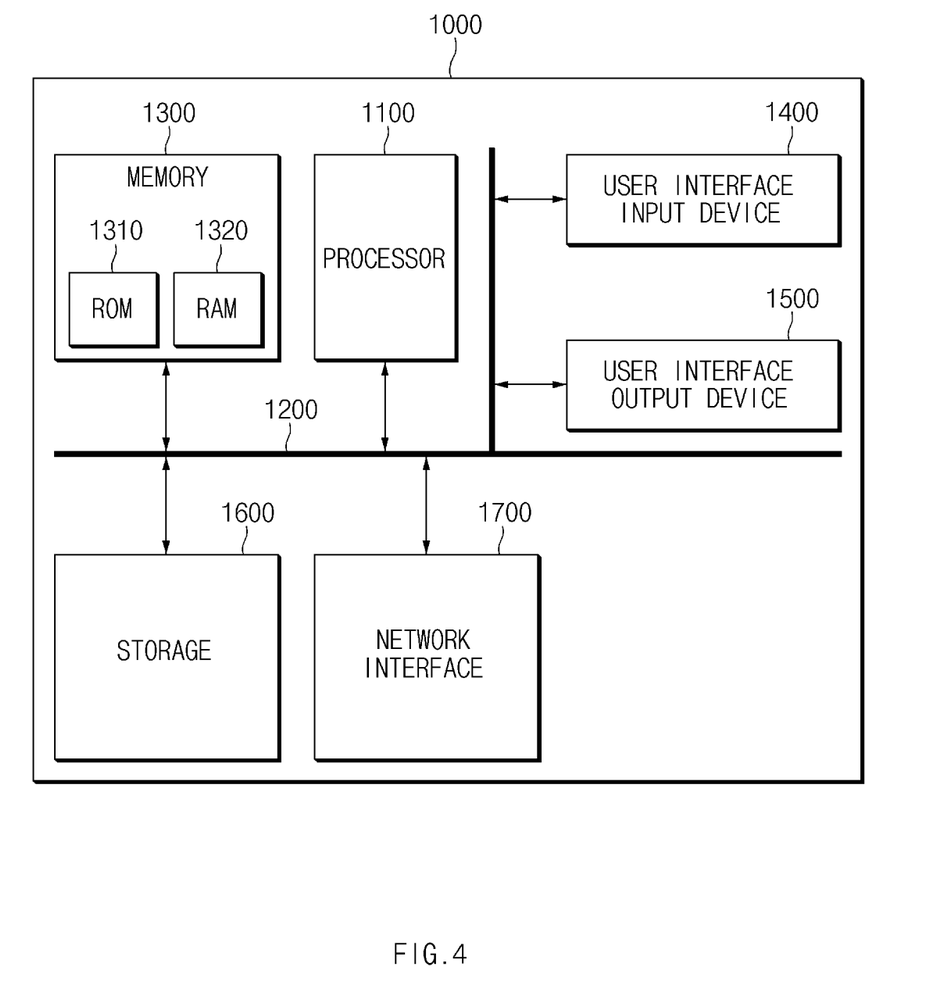
FIG. 4 is a block diagram illustrating a computing system for executing a method for controlling updates of ECUs of a vehicle according to an exemplary embodiment of the present disclosure.

FIG. 4 is a block diagram illustrating a computing system for executing a method for controlling updates of ECUs of a vehicle according to an exemplary embodiment of the present disclosure. Referring to FIG. 4, the method for controlling the update of the ECU of the vehicle according to an exemplary embodiment of the present disclosure described above may also be implemented through a computing system. A computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the exemplary embodiments. The scope of the present disclosure should be construed as being covered by the scope of the appended claims, and all technical ideas falling within the scope of the claims should be construed as being included in the scope of the present disclosure.

The device and the method for controlling the update of the ECU of the vehicle according to an exemplary embodiment of the present disclosure may, when performing the associated software updates of the ECUs arranged in the vehicle, determine whether to start the vehicle based on the SOC of the battery, divide the ECUs to be updated in the start on state of the vehicle and the ECUs to be updated in the start off state of the vehicle, and collectively perform the associated software updates of the ECUs, thereby normally completing the software update for the function involving the plurality of ECUs.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling updates of electronic control units (ECUs) of a vehicle, comprising:
   a communication device configured to receive a request for associated software updates of the ECUs arranged within the vehicle, wherein the associated software updates of the ECUs relate to an autonomous driving function of the vehicle; and
   a controller configured to:
      determine whether to start the vehicle based on a state of charge (SOC) of a battery;
      perform updates in a first group of ECUs in a start on state of the vehicle based on the state of charge (SOC) of the battery;
      perform updates in a second group of ECUs in a start off state of the vehicle;
      wherein the first group of ECUs and the second group of ECUs are two distinct groups; and
      complete the associated software updates of the first group of ECUs and the second group of ECUs within one driving cycle.

2. The device of claim 1, wherein the controller is configured to start the vehicle when the SOC of the battery is equal to or less than a reference SOC when the battery outputs a total amount of power required for the updates of the ECUs.

3. The device of claim 1, wherein the controller is configured to perform a rollback on an update-completed ECU when there is an update-failed ECU during performing the updates in the first group of ECUs.

4. The device of claim 1, wherein the controller is configured to turn off the vehicle and then perform the updates in the second group of ECUs when the updates in the first group of ECUs are completed.

5. The device of claim 4, wherein the controller is configured to turn off the vehicle when the SOC of the battery exceeds a reference SOC even when the battery outputs a total amount of power required for the updates in the second group of ECUs.

6. The device of claim 1, wherein the controller is configured to perform a rollback on an update-completed ECU when there is an update-failed ECU during performing the updates in the second group of ECUs.

7. The device of claim 1, wherein the communication device is configured to receive, from an update server, information on the plurality of ECUs to be updated, update data applied to each of the plurality of ECUs, information on the ECUs contained in the first group, and information on the ECUs contained in the second group.

8. The device of claim 1, further comprising:
   an output device configured to display a window prompting a user to approve the associated software updates; and
   an input device configured to receive approval or rejection for the associated software updates from the user.

9. A method for controlling updates of electronic control units (ECUs) of a vehicle, comprising:
   receiving, by a controller, a request for associated software updates of the ECUs arranged within the vehicle, wherein the associated software updates of the ECUs relate to an autonomous driving function of the vehicle;
   determining, by the controller, whether to start the vehicle based on a state of charge (SOC) of a battery;
   performing, by the controller, updates in a first group of ECUs in a start on state of the vehicle based on the state of charge (SOC) of the battery;
   performing, by the controller, updates in a second group of ECUs in a start off state of the vehicle;
   wherein the first group of ECUs and the second group of ECUs are two distinct groups; and
   completing, by the controller, the associated software updates of the first group of ECUs and the second group of ECUs within one driving cycle.

10. The method of claim 9, wherein the determining of whether to start the vehicle includes:
   starting, by the controller, the vehicle in response to determining that the SOC of the battery is equal to or less than a reference SOC when the battery outputs a total amount of power required for the updates of the ECUs.

11. The method of claim 9, wherein the performing of the updates in the first group of ECUs includes:
performing, by the controller, a rollback on an update-completed ECU when there is an update-failed ECU.

12. The method of claim 9, wherein the performing of the updates in the second group of ECUs includes:
turning off, by the controller, the vehicle when the updates in the first group of ECUs are completed.

13. The method of claim 9, wherein the performing of the updates in the second group of ECUs includes:
turning off, by the controller, the vehicle at a time point the updates in the first group of ECUs are completed in response to determining that the SOC of the battery exceeds a reference SOC even when the battery outputs a total amount of power required for the updates in the second group of ECUs.

14. The method of claim 9, wherein the performing of the updates in the second group of ECUs includes:
performing, by the controller, a rollback on an update-completed ECU when there is an update-failed ECU.

15. The method of claim 9, wherein the receiving of the request for the associated software updates of the ECUs arranged in the vehicle includes:
receiving, from an update server, information on the plurality of ECUs to be updated, update data applied to each of the plurality of ECUs, information on the ECUs contained in the first group, and information on the ECUs contained in the second group.

16. The method of claim 9, further comprising:
displaying, by the controller, a window prompting a user to approve the associated software updates; and
receiving, by the controller, approval or rejection for the associated software updates from the user.

17. A method for controlling updates of electronic control units (ECUs) of a vehicle, comprising:
receiving, by a controller, a request for associated software updates of the ECUs arranged in the vehicle;
displaying, by the controller, a window prompting a user to approve the updates;
receiving, by the controller, approval from the user;
starting, by the controller, the vehicle when a state of charge (SOC) of a battery is equal to or less than a reference SOC when the battery outputs a total amount of power required for the updates of the ECUs;
performing, by the controller, updates of ECUs in a first group in a start on state of the vehicle;
turning off, by the controller, the vehicle at a time point the updates of the ECUs in the first group are completed when the SOC of the battery exceeds the reference SOC even when the battery outputs a total amount of power required for updates of ECUs in a second group; and
performing, by the controller, the updates of the ECUs in the second group in a start off state of the vehicle.

18. The method of claim 17, wherein the performing of the updates of the ECUs in the first group includes:
performing, by the controller, a rollback on an update-completed ECU when there is an update-failed ECU.

19. The method of claim 17, wherein the performing of the updates of the ECUs in the second group includes:
performing, by the controller, a rollback on an update-completed ECU when there is an update-failed ECU.

* * * * *